United States Patent
Chang et al.

(10) Patent No.: US 7,784,070 B2
(45) Date of Patent: Aug. 24, 2010

(54) SATELLITE SIGNAL RECEIVE AND METHOD OF CONDITIONALLY ACCESSING DIGITAL TV PROGRAM BY USING THE SAME

(75) Inventors: Chieh-Pin Chang, Taoyuan Hsien (TW); Jen-Ping Weng, Taoyuan Hsien (TW)

(73) Assignee: Prime Electronics and Satellitics Incorporation, Taoyuan Hsien (TW)

( * ) Notice: Subject to any disclaimer, the term of this patent is extended or adjusted under 35 U.S.C. 154(b) by 462 days.

(21) Appl. No.: 11/745,206

(22) Filed: May 7, 2007

(65) Prior Publication Data
US 2008/0136969 A1    Jun. 12, 2008

(30) Foreign Application Priority Data
Dec. 7, 2006    (TW) ............... 95145751 A

(51) Int. Cl.
  H04N 7/16    (2006.01)
  H04N 7/167   (2006.01)
  H04N 7/20    (2006.01)
(52) U.S. Cl. ............... 725/25; 725/31; 725/63
(58) Field of Classification Search ............ 725/63–72, 725/74–85
See application file for complete search history.

(56) References Cited

U.S. PATENT DOCUMENTS

| | | | | |
|---|---|---|---|---|
| 5,898,680 A | * | 4/1999 | Johnstone et al. | 725/72 |
| 6,108,365 A | * | 8/2000 | Rubin et al. | 375/130 |
| 6,985,588 B1 | * | 1/2006 | Glick et al. | 380/258 |
| 7,401,349 B2 | * | 7/2008 | Knutson et al. | 725/64 |
| 2002/0104083 A1 | * | 8/2002 | Hendricks et al. | 725/34 |
| 2003/0212996 A1 | * | 11/2003 | Wolzien | 725/60 |
| 2005/0190777 A1 | * | 9/2005 | Hess et al. | 725/68 |
| 2005/0193419 A1 | * | 9/2005 | Lindstrom et al. | 725/71 |

* cited by examiner

*Primary Examiner*—Christopher Kelley
*Assistant Examiner*—Justin E Shepard
(74) *Attorney, Agent, or Firm*—Browdy and Neimark, PLLC

(57) ABSTRACT

A satellite signal receiver includes a downconverter, a GPS chip and a transmission controller. The downconverter downconverts satellite signal of digital television into baseband signal for output to the transmission controller. The GPS chip scrambles and encrypts GPS signal into address data and outputs address data to the transmission controller for enabling the transmission controller to convert address data into analog signal for output with the baseband signal to a set-top-box, which converts analog address data into digital GPS signal and compares it with an authorization address carried in the satellite signal and then outputs authorized digital television satellite signal when the comparison is matched.

9 Claims, 5 Drawing Sheets

SATELLITE SIGNAL RECEIVE AND METHOD OF CONDITIONALLY ACCESSING DIGITAL TV PROGRAM BY USING THE SAME

BACKGROUND OF THE INVENTION

1. Field of the Invention

The present invention relates generally to satellite signal receivers and more particularly, to a satellite signal receiver with a Global Positioning System (hereinafter referred to as "GPS") addressing function. The invention relates also to a method of conditional accessing digit TV program by using the satellite signal receiver.

2. Description of the Related Art

Following development of information technology, the application of communication technology for transmission of satellite signal has become more and more popular. In consequence, various related applied products such as GPS and satellite digital TV have appeared on the market. Following the step of television globalization, a signal system provider can use multiple satellites in a satellite track to let most satellite subscribers around the world receive the provided digital television signal (program). FIG. 1 is a schematic drawing showing a conventional digital television receiving system 1 at the subscriber end, which comprises an outdoor satellite dish 10, a Low Noise Block-downconverter (hereinafter referred to as "LNB") 11, and an indoor Set-Top-Box (hereinafter referred to as "STB") 12. When the satellite dish 10 receives a satellite signal from a commercial satellite of the system end, the LNB 11 processes the satellite signal through a series of amplification, frequency down-conversion, wave filtration and frequency stabilization treatment into a multi-band baseband signal and then outputs the signal to the STB 12. After demodulating and digitalizing the signal, the digital television channels provided by the system end can be outputted for receiving by the subscribers.

Under the consideration of commercial benefit, a system provider will limit the subscribers to conditionally receive digital television signal (digital television program) under authorization. Therefore, the STB has built therein a processor for recognizing the authorization, which compares the authorization code carried in the satellite signal provided by the system end to the built-in code, and then outputs the digital television signal (program) when the comparison is matched. A satellite television system provider using multiple satellites is capable of broadcasting digital television in different locations around the world. A satellite television system provider may provide different channel programs for different areas and charge different subscribers at different locations around the world at different charging rates. However, when a subscriber carries an STB authorized for accessing digital TV signal to a different zone, i.e., any zone where satellite signal of the system provider is available, the subscriber can watch the digital television of the respective zone. Therefore, a subscriber can use a STB purchased from a place of relatively lower charging rate in a place of relatively higher charging rate to watch digital television channels. To the system provider, this subscriber end is deemed as watching unauthorized television channels. However, because this subscriber is using an authorized hardware, the system provider has no way to prohibit this subscriber from watching the unauthorized television channels.

SUMMARY OF THE INVENTION

The present invention has been accomplished under the circumstances in view. It is one objective of the present invention to provide a satellite signal receiver and a method of conditionally accessing digital television signal by using the satellite signal receiver, which enable a satellite television system end to control each of its subscribers to receive digital television signal from the Set-Top-Box in a specific area only, thereby effectively prohibiting its subscribers from playing the digital television signal in an unauthorized area.

To achieve this objective of the present invention, the satellite signal receiver comprises a downconverter, a GPS chip and a transmission controller. The downconverter includes a feed horn for receiving a digital television satellite signal, and a signal output terminal set. The downconverter downconverts the digital television satellite signal received by the feed horn into a baseband signal and outputs the baseband signal through the signal output terminal set. The GPS chip includes an antenna for receiving a GPS signal, an address cryptographic component for scrambling the GPS signal received by the antenna into an address data, and a digital output terminal set through which the address data is outputted. The transmission controller includes a high-frequency input terminal set electrically connected to the signal output terminal set of the downconverter for receiving the baseband signal, a digital input terminal set electrically connected to the digital output terminal set of the GPS chip for receiving the address data, and an analog output terminal set. The transmission controller converts the address data into an analog signal and mixes the analog signal with the baseband signal for output through the analog output terminal set.

After receiving the baseband signal and the address date of analog format outputted from the analog output terminal set by an STB and processing the address data of analog format into a digital format by a digital signal processor of the STB, the address data is decoded into the GPS signal, which is in turn compared with an authorization address contained in the digital television satellite signal. When the GPS signal matches the authorization address, the digital television signal provided and authorized by the satellite TV system end is allowed to be outputted through the STB for accessing by the subscriber. When the GPS signal doesn't match the authorization address, the digital television signal is not allowed to be outputted through the STB such that the subscriber can not access the digital television signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
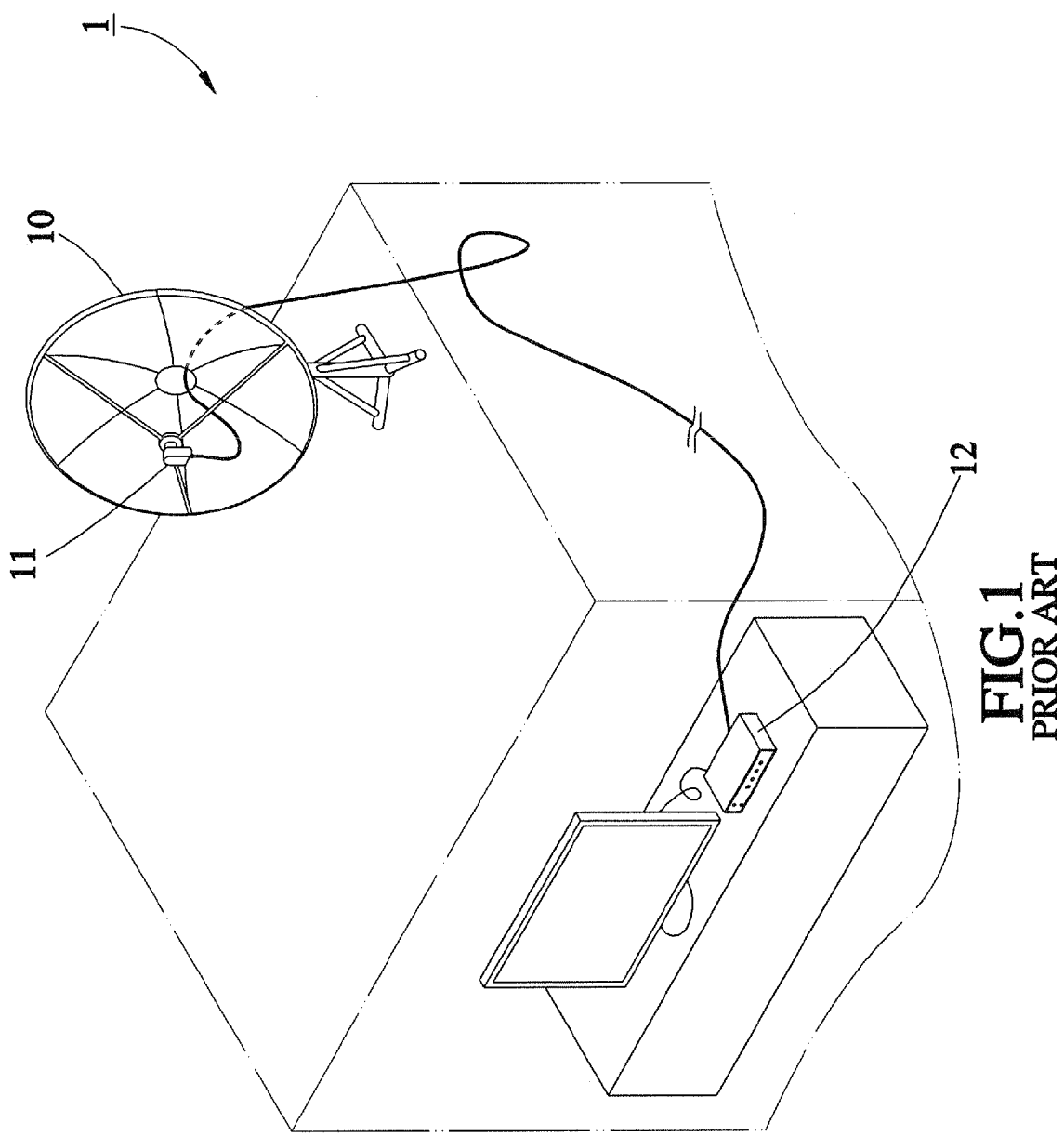
FIG. 1 is a schematic drawing illustrating a digital television receiving system according to the prior art.
Figure 2:
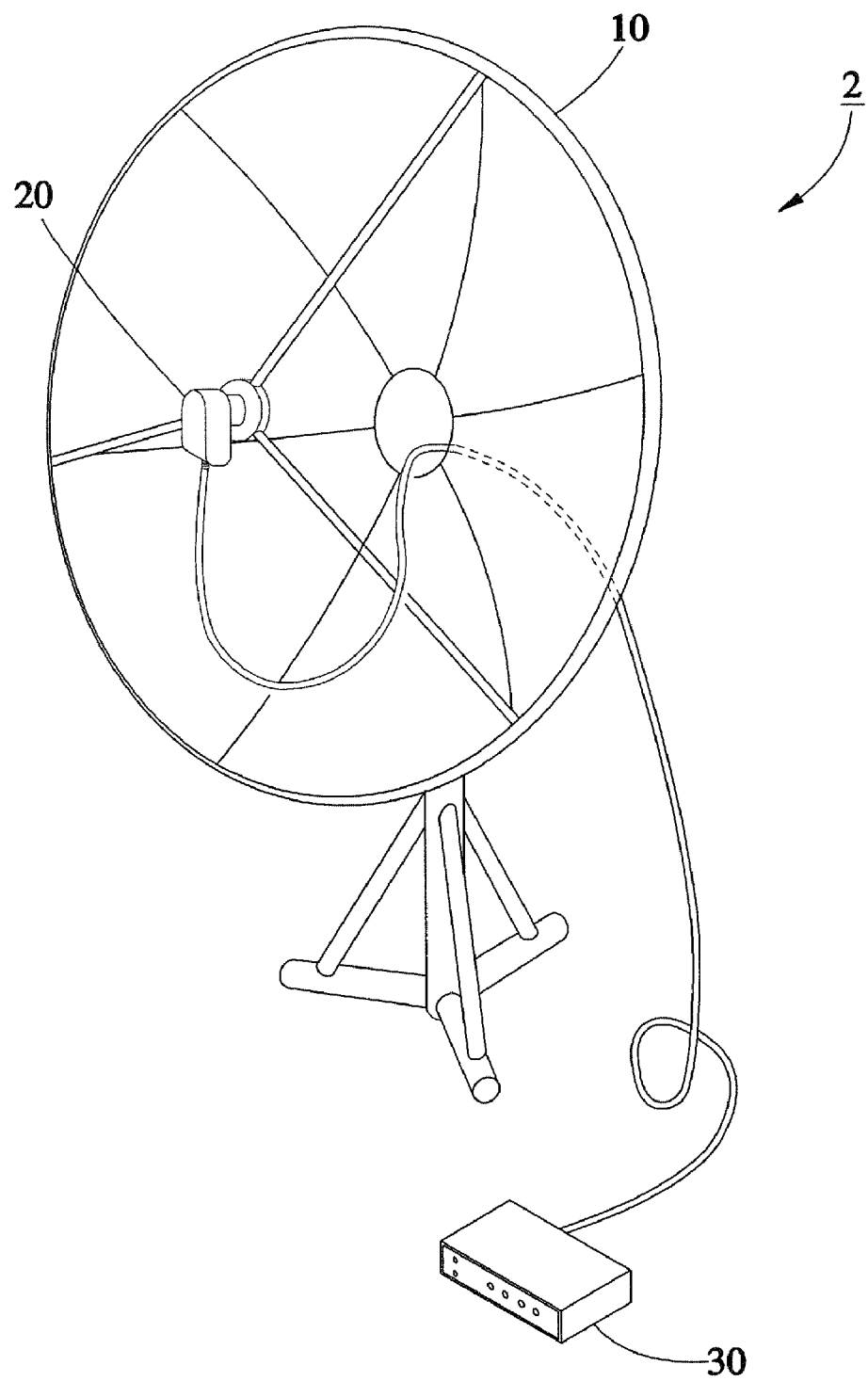
FIG. 2 is a schematic drawing illustrating a satellite signal receiver used in a digital television receiving system according to a preferred embodiment of the present invention.

Referring to FIG. 2, a satellite signal receiver 20 in accordance with a preferred embodiment of the present invention is shown used in a digital television receiving system 2. The digital television receiving system 2 comprises a satellite dish 10, the said satellite signal receiver 20, and an STB 30.

Figure 3:
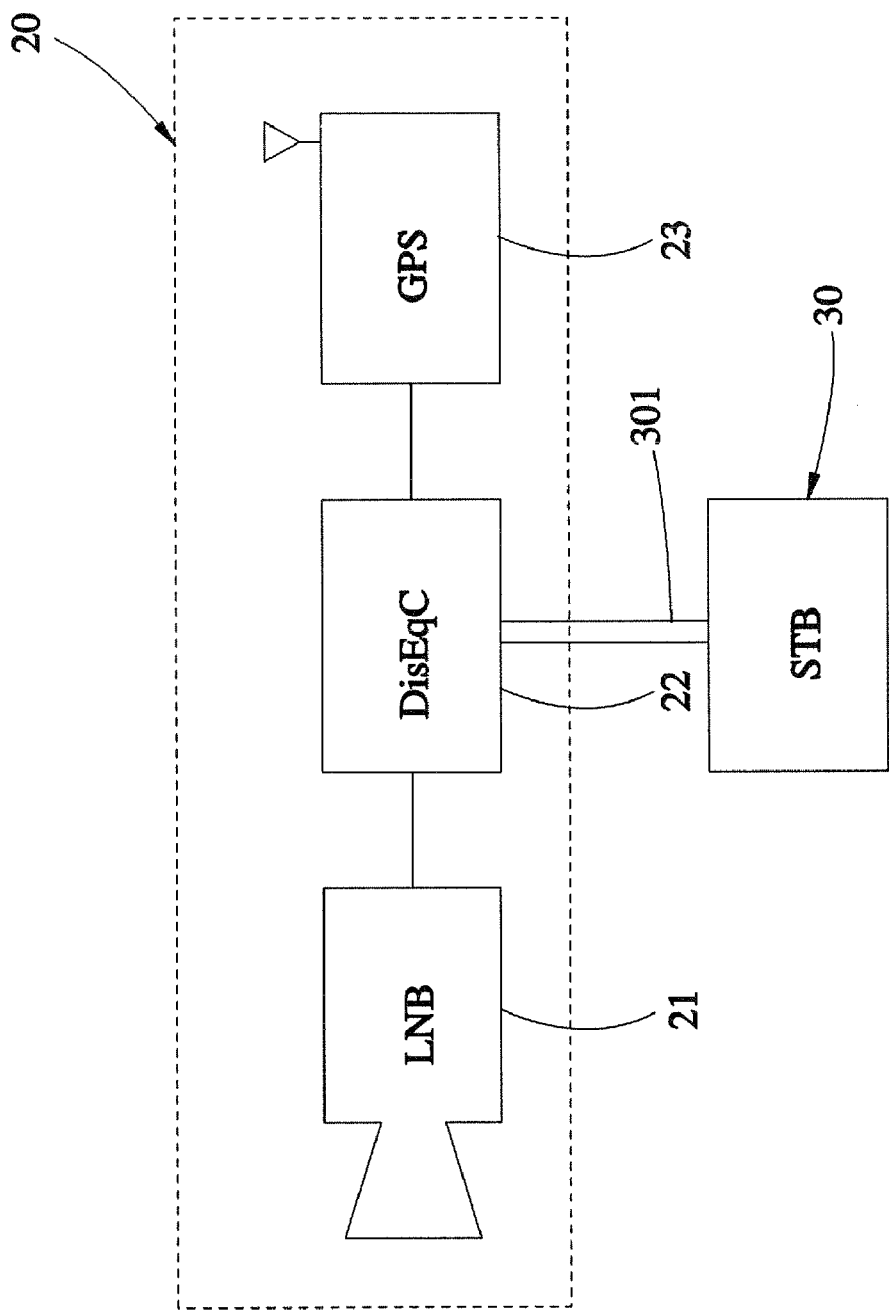
FIG. 3 is a system block diagram of the satellite signal receiver and the set-top-box according to the preferred embodiment of the present invention.

As shown in FIG. 3, the satellite signal receiver 20 comprises an LNB (Low Noise Block-downconverter) 21, a transmission controller 22, and a GPS (Global Position System) chip 23. The STB 30 is connected to the transmission controller 22 by a coaxial cable 301. The STB 30 is substantially similar to a conventional Set-Sop-Box in hardware structure with the exception of the functioning of its built-in codec and the way of cooperation with the satellite signal receiver 20.

Figure 4:
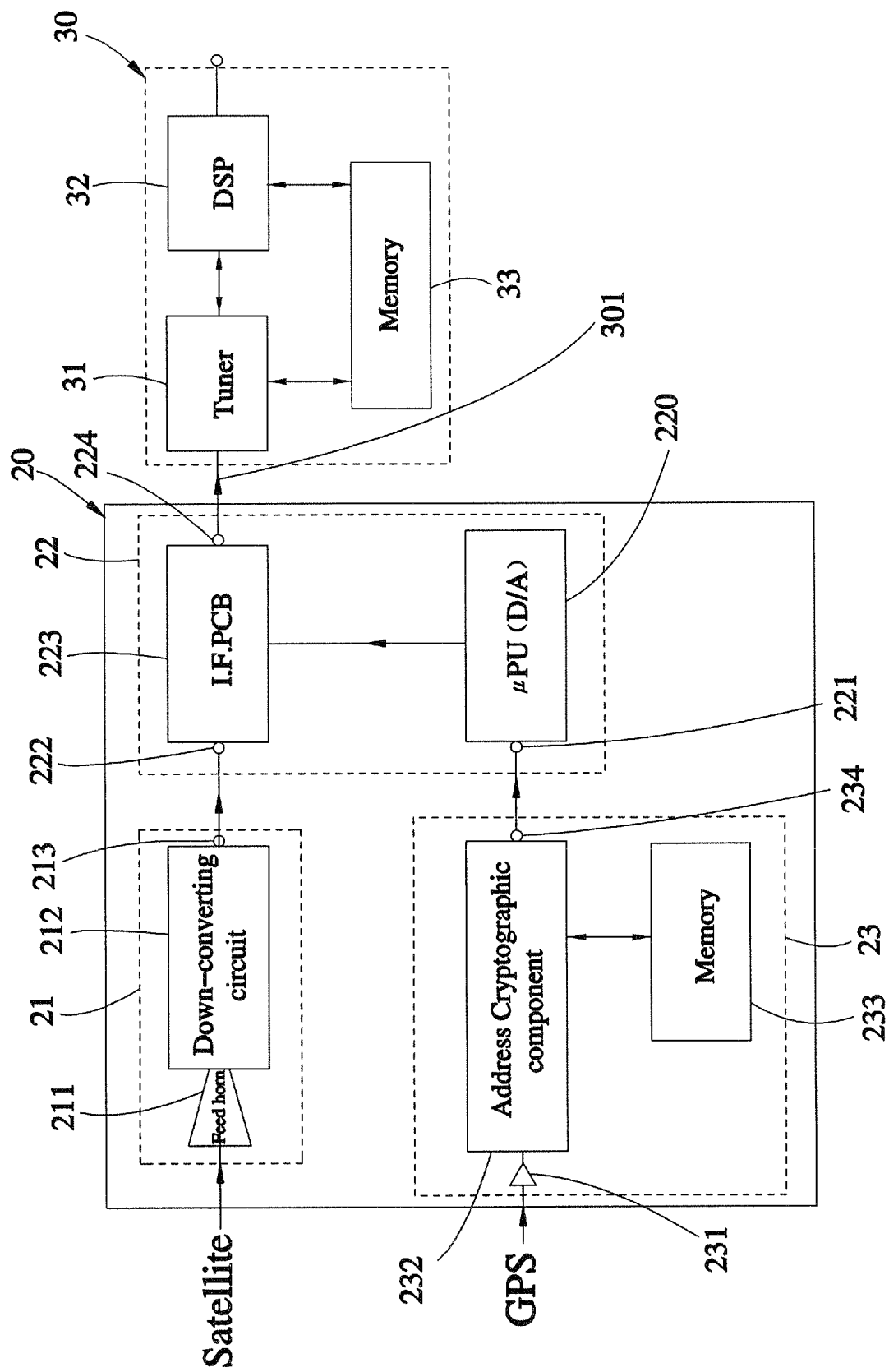
FIG. 4 is a circuit block diagram of FIG. 3.
Figure 5:
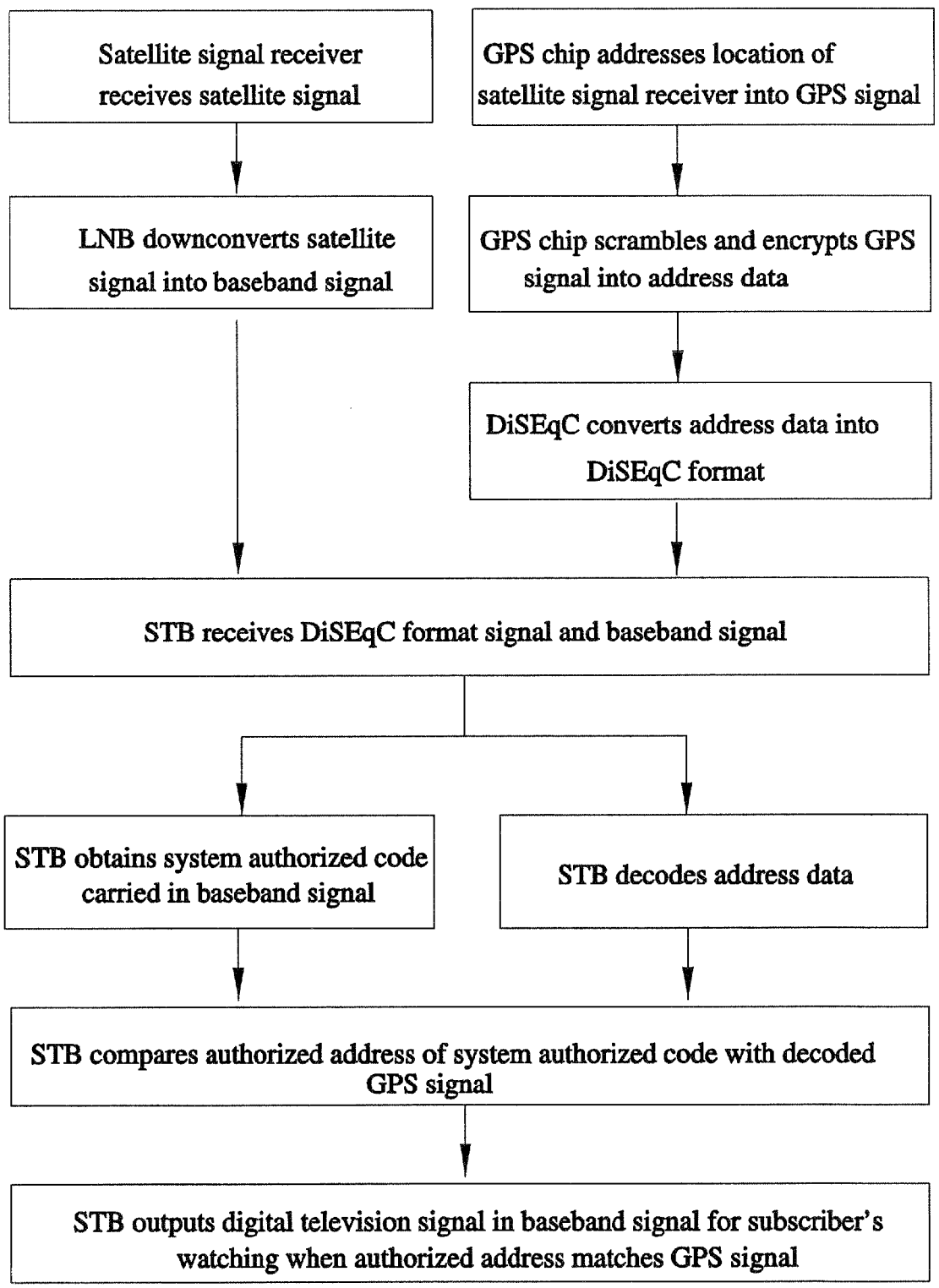
FIG. 5 is flow chart of a method of conditionally accessing digital TV signal by using the satellite signal receiver according to the present invention.

The built-in function/structure of the satellite signal receiver 20 and its functioning in the digital television receiving system 2 are described hereinafter with reference to FIG. 4.

The LNB 21 includes a feed horn 211, a down-converting circuit 212 and a signal output terminal set 213, which are properly electrically connected in order. The feed horn 211 is adapted to receive satellite signal so as to produce a high-frequency electromagnetic wave signal having a specific polarization direction, which is thereafter processed by the down-converting circuit 212 through a series of amplification, frequency down-conversion, wave filtration and frequency stabilization treatment into a baseband signal having a specific polarization direction and band, which is then outputted through the output terminal set 213.

The transmission controller 22 is used for signal switching control of the LNB 21. According to the present preferred embodiment, the transmission controller 22 is a DiSEqC (Digital Satellite Equipment Controller), comprising a control chip 220, a digital input terminal set 221, a high-frequency input terminal set 222, an analog transmission zone 223, and an analog output terminal set 224. The digital input terminal set 221 is electrically connected to the control chip 220 for the connection of an external peripheral apparatus and for receiving output digital data from the connected external peripheral apparatus so that the control chip 220 converts the output digital data from the connected external peripheral apparatus into DiSEqC format analog data and then transmits the same to the analog transmission zone 223. The analog transmission zone 223 is electrically connected to the control chip 220, and also electrically connected to the signal output terminal set 213 of the LNB 21 through the high-frequency input terminal set 222. The analog transmission zone 223 has a specific wiring arrangement. When the control chip 220 controls the LNB 21 to switch to the baseband signal of the selected polarization direction and band, the baseband signal is mixed with the analog transmission specification signal converted by the control chip 220 and then passed through the analog transmission zone 223 for output through the analog output terminal set 224.

The GPS chip 23 comprises an antenna 231, an address cryptographic component 232, a memory 233, and a digital output terminal set 234. The address cryptographic component 232 is electrically connected to the antenna 231, the memory 233, and the digital output terminal set 234. The antenna 231 is adapted to receive GPS signal. The address cryptographic component 232 is adapted to read in the built-in scrambler from the memory 233 for scrambling and encrypting the addressed GPS signal into address data for output through the digital output terminal set 234 to the digital input terminal set 221 of the transmission controller 22.

The STB 30 has a tuner 31, a Digital Signal Processor (thereinafter referred to as "DSP") 32, and a memory 33, which are electrically connected to one another. The tuner 31 is electrically connected to the analog output terminal set 224 of the transmission controller 22 by a coaxial cable 301, and adapted to separate the baseband signal for demodulation, for enabling the DPS 32 to get the output digital data of the external peripheral apparatus. The memory 33 has built therein a decoding program corresponding to the scrambler in the GPS chip 23 for enabling the DPS 32 to decode the digital data. After authorization matched, the DPS 32 processes the demodulated baseband signal through audio and video signal processing process for output.

The memory 233 of the GPS chip 23 of the satellite signal receiver 20 has built therein a program for scrambling and encrypting GPS signal and the memory 33 of the STB 30 has built therein a corresponding codec. When the satellite dish 10 of the digital television receiving system 2 receives any digital television satellite signal containing an authorization address sent by a satellite television system, the following steps for address recognition for conditionally accessing the digital television satellite signal will be proceeded.

a) The LNB 21 of the satellite signal receiver 20 produces a baseband signal having a specific polarization direction and band, and outputs the baseband signal to the STB 30 through the analog transmission zone 223 of the transmission controller 22.

b) The GPS chip 23 of the satellite signal receiver 20 converts its location into a GPS signal by a GPS addressing processing and scrambles and encrypts the GPS signal into an address data, and then outputs the address data to the digital input terminal set 221 of the transmission controller 22.

c) The control chip 220 of the transmission controller 22 converts the address data into a specific analog format through a digital-to-analog conversion, and then outputs the analog address data to the STB 30 through the analog transmission zone 223.

The DSP 32 of the STB 30 converts the analog address data into a digital format, and then reads in the built-in codec from the memory 323, and then decodes the digital address data into the GPS signal, and then compares the GPS signal with the authorization address carried in the satellite signal. The STB 30 thereafter outputs the digital television signal for play when the GPS signal matches the authorization address, or does not allow output of the digital television signal for play when the GPS signal is not in match with the authorization address.

Therefore, the satellite signal receiver and the method of conditionally accessing digital television satellite signal using the satellite signal receiver of the present invention enable a satellite television system end to control each of its subscribers to receive digital television signal from the Set-Top-Box in a specific geographic area only, thereby effectively prohibiting its subscribers from playing the digital television signal in an unauthorized area.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A satellite signal receiver comprising:
   a downconverter having a feed horn for receiving a digital television satellite signal, and a signal output terminal set, said downconverter downconverting the digital television satellite signal received by said feed horn into a baseband signal and outputting the baseband signal through said signal output terminal set;
   a GPS chip having an antenna for receiving a GPS signal, an address cryptographic component for scrambling the GPS signal received by said antenna into an address data, and a digital output terminal set through which said address data is outputted; and
   a transmission controller having a high-frequency input terminal set electrically connected to said signal output terminal set of said downconverter for receiving said baseband signal, a digital input terminal set electrically connected to said digital output terminal set of said GPS chip for receiving said address data, and an analog output terminal set, said transmission controller converting said address data into an analog signal and mixing said analog signal with said baseband signal for output through said analog output terminal set.

2. The satellite signal receiver as claimed in claim 1, wherein said GPS chip further comprises a memory electrically connected to said address cryptographic component and stored therein with a scrambling program for enabling said address cryptographic component to scramble said GPS signal.

3. The satellite signal receiver as claimed in claim 1, wherein said transmission controller is compatible with DiSEqC communication protocol.

4. The satellite signal receiver as claimed in claim 3, wherein said transmission controller further comprises an analog transmission zone electrically connected to said high-frequency input terminal set and said analog output terminal set, said analog transmission zone having a predetermined transmission wiring arrangement allowing passing of analog signal, such that said baseband signal and said analog signal of said address data can be mixed and outputted through said analog output terminal set.

5. A method of conditionally accessing satellite television program for enabling a satellite television system end to control a subscriber thereof to receive digital television signal from a set-top-box in a specific geographic area only, the method comprising the steps of:
   a) sending out a digital television satellite signal containing an authorization address from a satellite television system end;
   b) receiving and processing said digital television satellite signal and then outputting the processed digital television satellite signal into a set-top-box by a satellite signal receiver;
   c) converting the geographic location of said satellite signal receiver into a GPS signal through a GPS addressing processing, scrambling and encrypting said GPS signal into an address data, and outputting said address data to said set-top-box by said satellite signal receiver; and
   d) descrambling and decrypting said address data into said GPS signal and comparing said GPS signal with said authorization address of said digital television satellite signal, and outputting said digital television signal when said GPS signal matches said authorization address by said set-top-box.

6. The method as claimed in claim 5, wherein the step of processing said digital television satellite signal is carried out by frequency downconverting and stabilizing said digital television satellite signal into a baseband signal in step b).

7. The method as claimed in claim 5, wherein said address data is converted into an analog format before said address data is outputted to said set-top-box in step c).

8. The method as claimed in claim 7, wherein said set-top-box converts said address data of analog format into said address data of digital format in step d).

9. The method as claimed in claim 7, wherein said address data of analog format is mixed with said digital television satellite signal and outputted to said set-top-box through a coaxial cable in step c).

* * * * *